US010001245B2

(12) United States Patent
Bain et al.

(10) Patent No.: US 10,001,245 B2
(45) Date of Patent: Jun. 19, 2018

(54) APPARATUS AND METHOD FOR COUPLING AN END EFFECTOR TO A STRUCTURE

(71) Applicant: The Boeing Company, Huntington Beach, CA (US)

(72) Inventors: David Michael Bain, Ashburton (AU); Phillip John Crothers, Hampton East (AU); Ashleigh Raoul Nesbit, Williamstown (AU)

(73) Assignee: THE BOEING COMPANY, Chicago, IL (US)

( * ) Notice: Subject to any disclaimer, the term of this patent is extended or adjusted under 35 U.S.C. 154(b) by 353 days.

(21) Appl. No.: 14/562,828

(22) Filed: Dec. 8, 2014

(65) Prior Publication Data
US 2016/0161055 A1    Jun. 9, 2016

(51) Int. Cl.
*F16M 13/02*    (2006.01)
*B60V 1/00*    (2006.01)
(Continued)

(52) U.S. Cl.
CPC ............ *F16M 13/022* (2013.01); *B25J 5/002* (2013.01); *B60V 1/00* (2013.01); *B62D 57/024* (2013.01); *B64F 5/00* (2013.01)

(58) Field of Classification Search
CPC ..... B23B 11/005; B23B 11/007; B23B 11/00; B23B 5/142; B23B 5/145; B23B 47/28;
(Continued)

(56) References Cited

U.S. PATENT DOCUMENTS 3,246,711 A * 4/1966 Snoeyenbos ........... B60V 3/025
                                                    180/124
3,779,198 A * 12/1973 Gray ....................... B63B 19/04
                                                    114/178
(Continued)

FOREIGN PATENT DOCUMENTS

FR    2538743 A1    7/1984
FR    2607093 A1    5/1988
GB    2272420 A     5/1994

OTHER PUBLICATIONS

Hoefener, Matthias, and Thorsten Schueppstuhl. "Small industrial robots for on-aircraft repair of composite structures." ISR/Robotik 2014; 41st International Symposium on Robotics; Proceedings of. VDE, 2014, pp. 422-427.
(Continued)

*Primary Examiner* — Christopher M Koehler
*Assistant Examiner* — Brian Keller
(74) *Attorney, Agent, or Firm* — Armstrong Teasdale LLP (57) ABSTRACT

A base assembly for coupling an end effector to a structure includes a first side and an opposite second side. The first side configured to couple to the end effector. The base assembly also includes at least one cavity disposed on the second side, and at least one pneumatic generator coupled in flow communication with the at least one cavity. The at least one pneumatic generator is operable in a suction mode and a blower mode. The second side having the at least one cavity is securely coupleable to a surface of the structure via a vacuum force induced by the at least one pneumatic generator in the suction mode, and the second side having the at least one cavity is movable substantially frictionlessly across the surface via an air cushion induced by the at least one pneumatic generator in the blower mode.

17 Claims, 9 Drawing Sheets

(51) Int. Cl.
*B62D 57/024* (2006.01)
*B64F 5/00* (2017.01)
*B25J 5/00* (2006.01)

(58) Field of Classification Search
CPC .............. B23B 47/287; B23B 2247/12; B23B 2215/04; B26D 7/018; B25J 15/0052; B25H 1/0064; B23Q 3/088; B23Q 9/007; B23Q 9/0014; B23Q 9/02
USPC .................................... 269/21, 58, 59, 16, 87
See application file for complete search history.

(56) References Cited

U.S. PATENT DOCUMENTS

| | | | |
|---|---|---|---|
| 4,674,949 A | 6/1987 | Kroczynski | |
| 5,890,553 A | 4/1999 | Bar-Cohen et al. | |
| 6,237,453 B1* | 5/2001 | Snow | B23Q 1/267 82/110 |
| 7,076,335 B2 | 7/2006 | Seemann | |
| 7,155,307 B2 | 12/2006 | Seemann | |
| 7,280,890 B2 | 10/2007 | Seemann | |
| 8,459,384 B2 | 6/2013 | Niederberger | |
| 2008/0156377 A1* | 7/2008 | Mann | B09B 3/0058 137/263 |
| 2013/0174397 A1* | 7/2013 | Katzenberger | B21J 15/10 29/426.2 |
| 2014/0115894 A1 | 5/2014 | Gamboa | |

OTHER PUBLICATIONS

Extended European Search Report, dated Apr. 19, 2016, for co-pending EP patent application No. EP 15196933.4 (7 pgs.).

* cited by examiner

APPARATUS AND METHOD FOR COUPLING AN END EFFECTOR TO A STRUCTURE

BACKGROUND

The field of the disclosure relates generally to end effectors, and, more particularly, to apparatus and methods for coupling an end effector to a structure.

End effectors are used to facilitate at least some known manufacture, inspection, maintenance, and/or repair operations of at least some known structures, for example but not limited to aircraft structures. At least some such operations use a secondary support structure positioned adjacent the structure of interest to support such end effectors. However, erection and positioning of the secondary support structure increases an amount of time, labor, and equipment required for the manufacture, inspection, maintenance, and/or repair operations, and introduces a risk of accidental damage to the structure of interest. In addition, at least some known manufacture, inspection, maintenance, and/or repair operations use a vacuum suction device to couple such end effectors to a surface of the structure. However, maneuvering the end effector and vacuum suction device into position along the structure of interest also increases an amount of time and labor required for the operations and introduces a risk of accidental damage to the structure of interest.

BRIEF DESCRIPTION

In one aspect, a base assembly for coupling an end effector to a structure is provided. The base assembly includes a first side and an opposite second side. The first side configured to couple to the end effector. The base assembly also includes at least one cavity disposed on the second side, and at least one pneumatic generator coupled in flow communication with the at least one cavity. The at least one pneumatic generator is operable in a suction mode and a blower mode. The second side having the at least one cavity is securely coupleable to a surface of the structure via a vacuum force induced by the at least one pneumatic generator in the suction mode, and the second side having the at least one cavity is movable substantially frictionlessly across the surface via an air cushion induced by the at least one pneumatic generator in the blower mode.

In another aspect, an end effector system coupleable to a structure is provided. The end effector system includes a base assembly that includes a first side and an opposite second side. The base assembly first side is coupled to an end effector. The end effector system also includes at least one cavity disposed on the base assembly second side, and at least one pneumatic generator coupled in flow communication with the at least one cavity. The at least one pneumatic generator is operable in a suction mode and a blower mode. The base assembly second side having the at least one cavity is securely coupleable to a surface of the structure via a vacuum force induced by the at least one pneumatic generator in the suction mode, and the base assembly second side having the at least one cup is movable substantially frictionlessly across the surface via an air cushion induced by the at least one pneumatic generator in the blower mode.

In another aspect, a method of making a base assembly for coupling an end effector to a structure is provided. The method includes configuring a first side of the base assembly to couple to the end effector and disposing at least one cavity on a second side of the base assembly opposite the first side. The method also includes coupling at least one pneumatic generator in flow communication with the at least one cavity. The at least one pneumatic generator is operable in a suction mode and a blower mode. The second side having the at least one cavity is securely coupleable to a surface of the structure via a vacuum force induced by the at least one pneumatic generator in the suction mode, and the second side having the at least one cavity is movable substantially frictionlessly across the surface via an air cushion induced by the at least one pneumatic generator in the blower mode.

The features, functions, and advantages that have been discussed can be achieved independently in various embodiments or may be combined in yet other embodiments further details of which can be seen with reference to the following description and drawings.

DETAILED DESCRIPTION

Embodiments of the apparatus and methods described herein provide for coupling an end effector to a structure, such as a structure to be worked on by the end effector. The embodiments provide a base assembly that includes at least one cavity, such as a suction cup, coupled to at least one reversible pneumatic generator. The base assembly is configured to securely couple to a surface of the structure when the pneumatic generator draws a vacuum through the at least one cavity. The base assembly also is configured to move substantially frictionlessly across the surface when the pneumatic generator is reversed to blow air out of the at least one cavity. The embodiments further provide an interface structure that locates and secures the end effector on the base assembly quickly and accurately.

Figure 1:
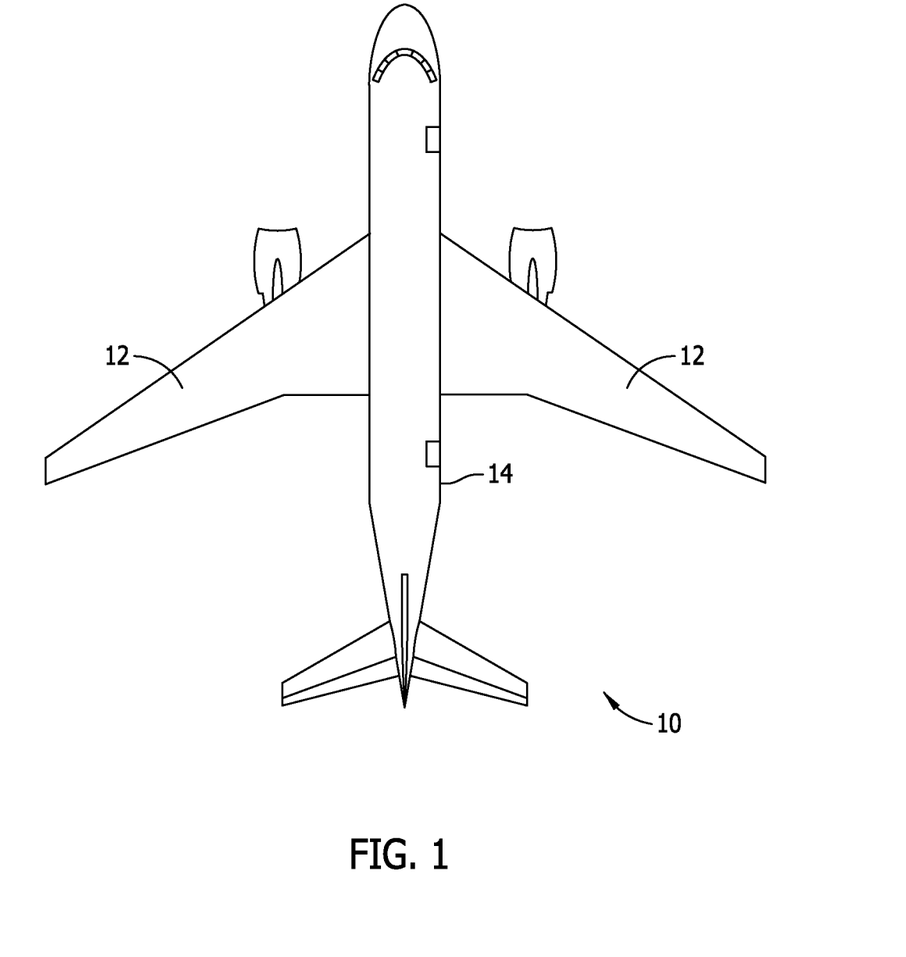
FIG. 1 is a schematic view of an exemplary aircraft.

Referring more particularly to the drawings, implementations of the disclosure may be described in the context of an aircraft 10 shown schematically in FIG. 1. Aircraft 10 includes at least one wing 12 that extends from a fuselage 14. The plurality of structures shown on aircraft 10 is for illustrative purposes only, and it should be understood that aircraft 10 additionally includes a large number of other structures. Moreover, it should be understood that, although an aerospace example is shown, the principles of the disclosure may be applied to other structures, such as a maritime structure or an automotive structure.

Figure 2:
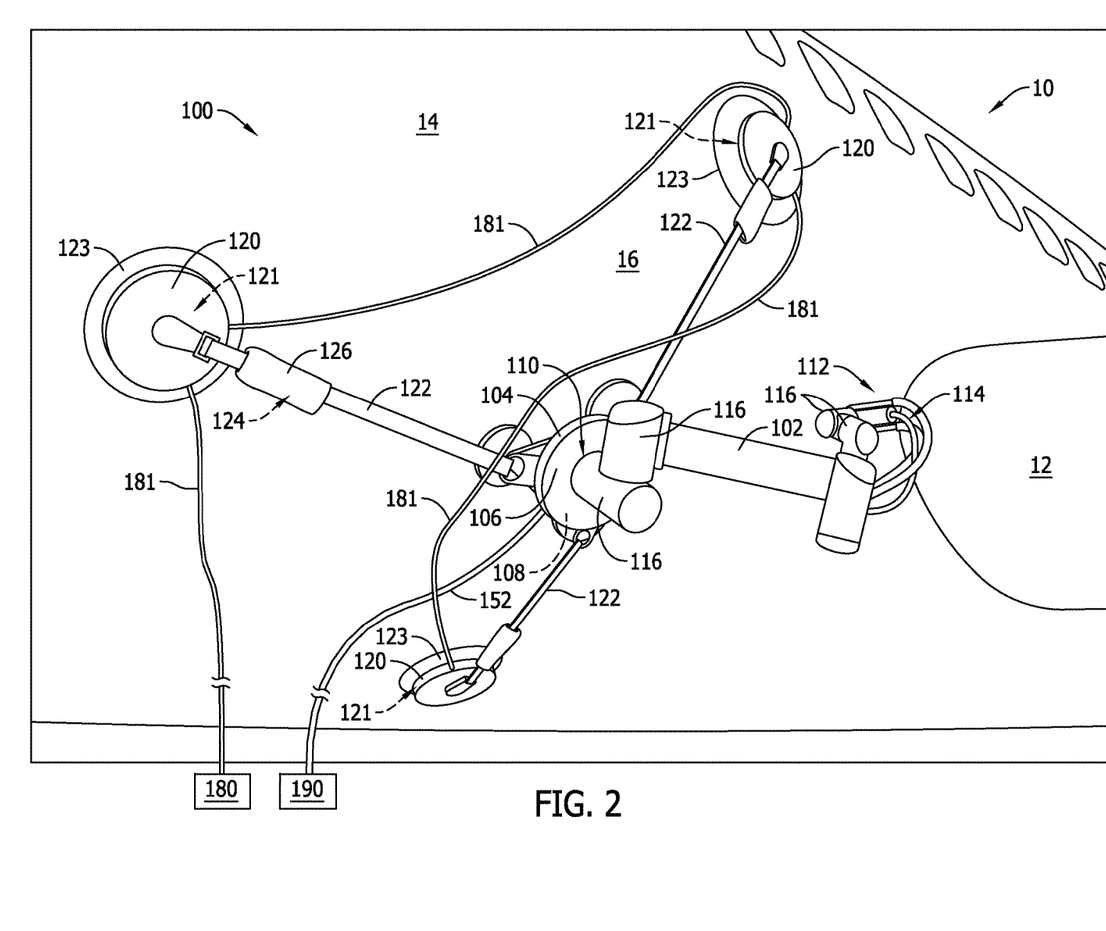
FIG. 2 is a schematic perspective view of an exemplary embodiment of an end effector system coupled to the exemplary aircraft 10 shown in FIG. 1.

FIG. 2 is a schematic perspective view of an exemplary embodiment of an end effector system 100 coupled to fuselage 14 of aircraft 10. Although end effector system 100 is illustrated as coupled to fuselage 14 of aircraft 10, it should be understood that end effector system 100 may be coupled to any suitable location on aircraft 10, or to another suitable structure other than aircraft 10.

In the exemplary embodiment, end effector system 100 includes an end effector 102 coupled to a base assembly 104. Base assembly 104 also is coupled to a surface 16 of fuselage 14. More specifically, a first side 106 of base assembly 104 is coupled to end effector 102, and a second side 108 of base assembly 104, opposite first side 106, is releasably coupled to surface 16 via a vacuum force, as will be described herein. When end effector system 100 is in operation, base assembly first side 106 is configured to face generally away from surface 16, and base assembly second side 108 is configured to face generally toward surface 16.

In the exemplary embodiment, end effector 102 extends from a first end 110 to a second end 112. End effector first end 110 is coupled to base assembly first side 106, and end effector second end 112 is configured to hold at least one tool 114. In the exemplary embodiment, end effector 102 is configured to manipulate the at least one tool 114 to perform certain operations on aircraft 10, such as but not limited to at least one of manufacture, inspection, maintenance, and repair operations. More specifically, end effector 102 is an articulable robot arm that is positionable using a plurality of servo-controlled actuators 116. In alternative embodiments, end effector 102 is any other suitable end effector that enables end effector system 100 to function as described herein.

In the exemplary embodiment, end effector system 100 also includes at least one secondary coupling system 120. The at least one secondary coupling system 120 provides redundant support for end effector 102 in the event that base assembly 104 unexpectedly uncouples from surface 16. In the illustrated embodiment, the at least one secondary coupling system 120 includes three secondary coupling systems 120. In alternative embodiments, the at least one secondary coupling system 120 includes any suitable number of secondary coupling systems 120 that enables end effector system 100 to function as described herein. In other alternative embodiments, end effector system 100 does not include any secondary coupling systems 120.

Each secondary coupling system 120 defines a secondary coupling system cavity 121 that is releasably coupleable to surface 16 via a secondary coupling system vacuum force. In the exemplary embodiment, each secondary coupling system cavity 121 is defined by a cup-shaped portion 123. In the exemplary embodiment, each cup-shaped portion 123 includes a generally circular rim configured to sealingly couple to surface 16 when the secondary coupling system vacuum force is applied to secondary coupling system cavity 121. In alternative embodiments, each cup-shaped portion 123 has any suitable configuration that enables end effector system 100 to function as described herein. In the exemplary embodiment, each secondary coupling system cavity 121 is coupled in flow communication with a secondary source vacuum pump 180 that cooperates with cavity 121 to generate the secondary coupling system vacuum force. For example, each secondary coupling system cavity 121 is coupled in flow communication with secondary source vacuum pump 180 via a secondary coupling system line 181.

In the exemplary embodiment, each secondary coupling system 120 is releasably coupled to base assembly 104 via a strap 122. In certain embodiments, strap 122 is formed from a substantially non-abrasive material to avoid potential damage to surface 16. In the exemplary embodiment, each strap 122 includes a ratchet strap-tightening mechanism 124 for efficient re-configuration of secondary coupling system 120 each time end effector system 100 is repositioned on surface 16. Ratchet strap-tightening mechanism 124 is covered by padding 126 when not in use to avoid potential damage to surface 16. For example, in an embodiment (not shown), base assembly 104 is coupled to an upper surface of wing 12 near an edge of wing 12, secondary coupling system 120 is coupled to a lower surface of wing 12 near the edge of wing 12, and strap 122 is coupled between base assembly 104 and secondary coupling system 120 and ratcheted taut by strap-tightening mechanism 124, yet strap 122 and strap-tightening mechanism 124 do not damage the edge of wing 12.

In certain embodiments, base assembly 104 includes at least one ring 174 (shown in FIGS. 3 and 4), and each at least one ring 174 is configured to couple to a corresponding strap 122. For example, in the exemplary embodiment, the at least one ring 174 includes three rings 174. In alternative embodiments, base assembly 104 includes any suitable number of rings 174 for coupling to corresponding straps 122. In other alternative embodiments, base assembly 104 includes any suitable alternative structure for coupling to straps 122.

Figure 3:
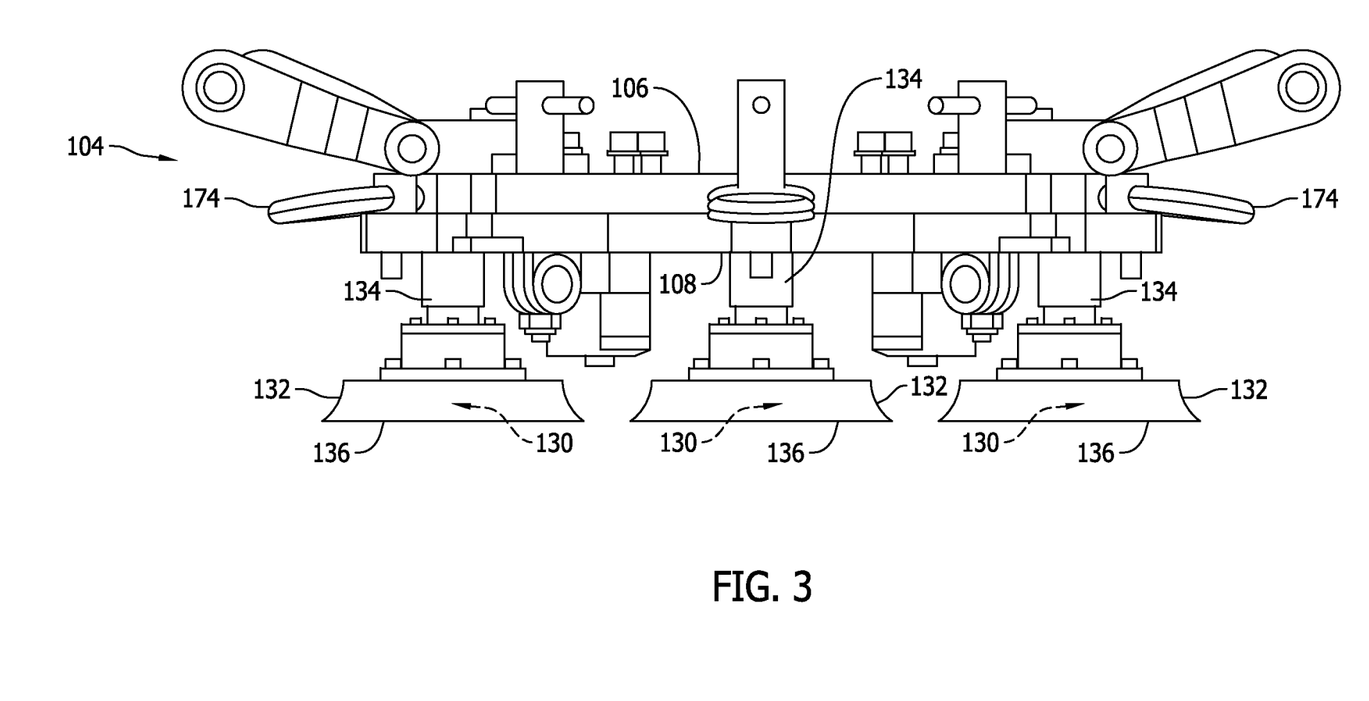
FIG. 3 is a schematic side view of an exemplary embodiment of a base assembly 104 for use with the end effector system shown in FIG. 2.
Figure 4:
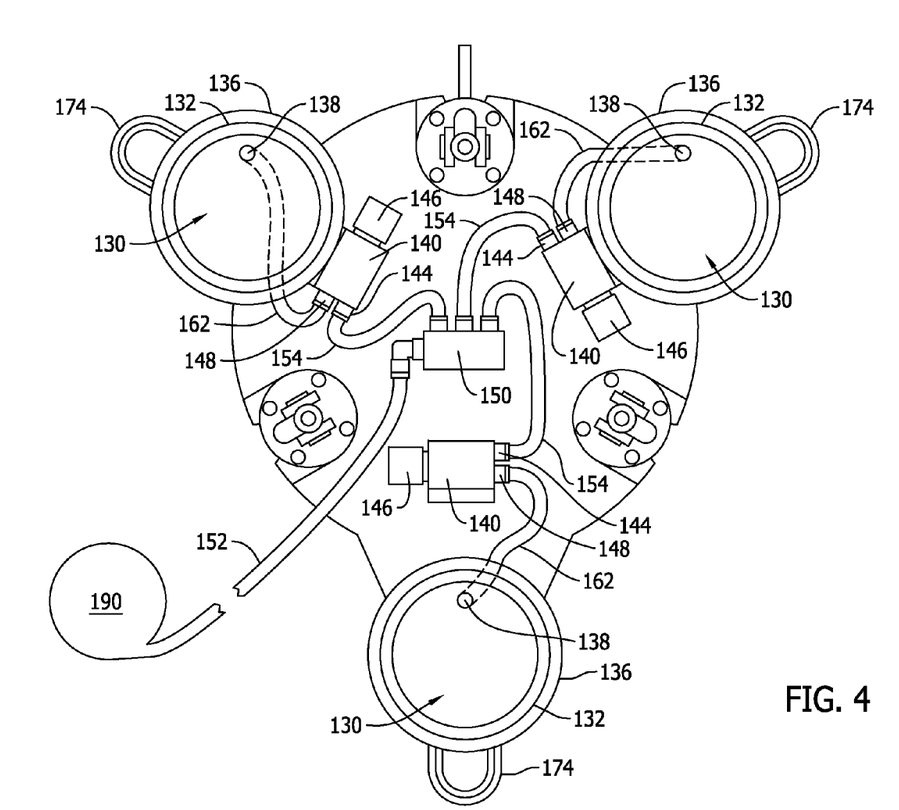
FIG. 4 is a schematic view of a second side of the exemplary base assembly shown in FIG. 3.

FIG. 3 is a schematic side view of an exemplary embodiment of base assembly 104, and FIG. 4 is a schematic view of second side 108 of the exemplary embodiment of base assembly 104. With reference to FIGS. 3 and 4, at least one cavity 130 is disposed on base assembly second side 108. In the illustrated embodiment, the at least one cavity 130 includes three cavities 130. In alternative embodiments, the at least one cavity 130 includes any suitable number of cavities 130 that enables end effector system 100 to function as described herein.

In the exemplary embodiment, each cavity 130 is defined by a cup-shaped portion 132 that depends from base assembly second side 108. More specifically, each cup-shaped portion 132 is coupled to base assembly second side 108 by a leg 134 that extends from base assembly second side 108. In the exemplary embodiment, each cup-shaped portion 132 includes a generally circular rim 136 configured to sealingly couple to surface 16 when a vacuum force is applied to cavity 130. In alternative embodiments, each cup-shaped portion 132 has any suitable configuration that enables end effector system 100 to function as described herein. In the exemplary embodiment, to facilitate the sealing coupling, each leg 134 includes a ball joint that enables each cup-shaped portion 132 to adjust independently to a local contour of surface 16 (shown in FIG. 2). In alternative embodiments, the at least one cavity 130 is disposed on base assembly second side 108 in any suitable fashion that enables end effector system 100 to function as described herein.

Each at least one cavity 130 is in flow communication with at least one pneumatic generator 140. More specifically, each cavity 130 is in flow communication with an orifice 138 that is in flow communication with the at least one pneumatic generator 140. In the exemplary embodiment, orifice 138 is defined in cup-shaped portion 132 and extends therethrough. In alternative embodiments, orifice 138 is defined in any suitable fashion that enables end effector system 100 to function as described herein.

Each at least one pneumatic generator 140 includes an inlet 144, a discharge 146, and a process connection 148. Each pneumatic generator process connection 148 is coupled in flow communication with at least one orifice 138. More specifically, in the exemplary embodiment, the at least one pneumatic generator 140 includes three pneumatic generators 140, and process connection 148 of each pneumatic generator 140 is coupled in flow communication with orifice 138 of a corresponding cavity 130 via a respective process line 162. In alternative embodiments, the at least one pneumatic generator 140 includes a single pneumatic generator 140, and orifice 138 of each cavity 130 is coupled to the single pneumatic generator 140. In alternative embodiments, process connection 148 of the at least one pneumatic generator 140 is coupled to orifice 138 of the at least one cavity 130 in any suitable arrangement that enables end effector system 100 to function as described herein.

Figure 5:
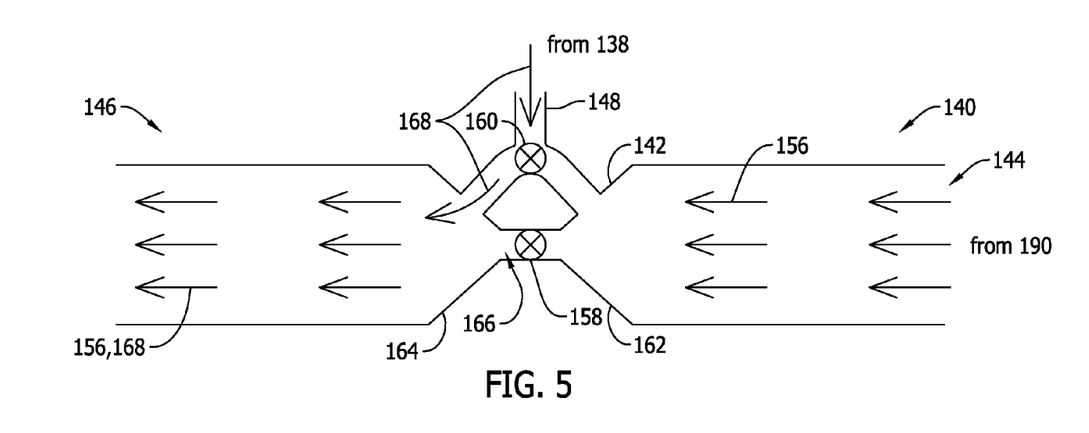
FIG. 5 is a schematic illustration of an exemplary embodiment of a pneumatic generator for use with the exemplary base assembly shown in FIG. 3, operating in a suction mode.
Figure 6:
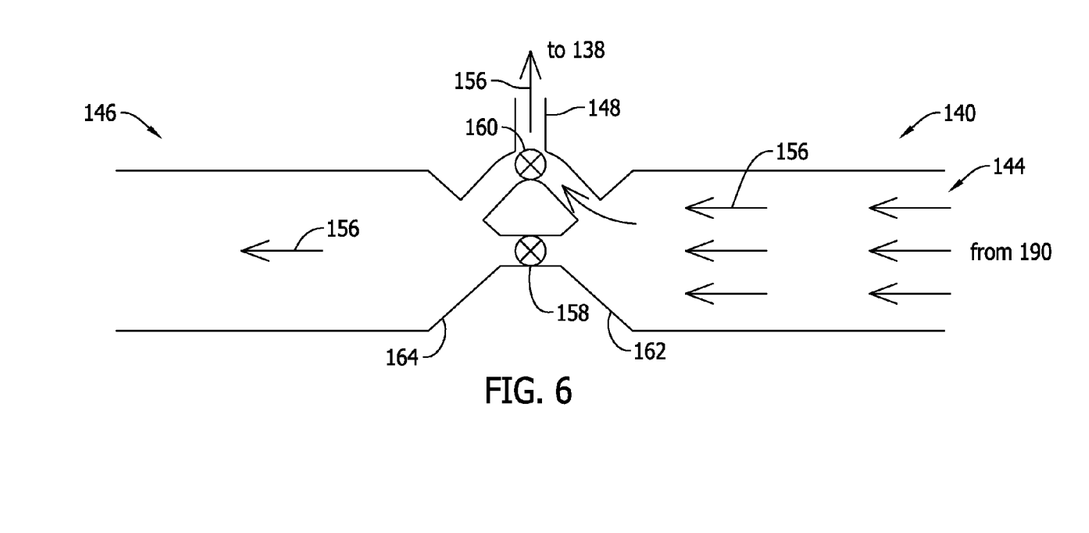
FIG. 6 is a schematic illustration of the exemplary pneumatic generator shown in FIG. 5, operating in a blower mode.

Also in the exemplary embodiment, inlet 144 of each at least one pneumatic generator 140 is coupled in flow communication with a supply of a motive fluid 156 (shown in FIGS. 5 and 6). For example, in the exemplary embodiment, each pneumatic generator inlet 144 is coupled in flow communication with pump 190 that supplies compressed air as the motive fluid 156. More specifically, each inlet 144 is coupled in flow communication with pump 190 via a manifold 150 coupled to base assembly 104. For example, pump 190 is coupled in flow communication with manifold 150 via a supply line 152, and inlet 144 of each at least one pneumatic generator 140 is coupled in flow communication with manifold 150 via a respective inlet line 154. In alternative embodiments, each at least one pneumatic generator 140 is coupled in flow communication with pump 190 in any suitable fashion that enables end effector system 100 to function as described herein. In other alternative embodiments, pneumatic generator inlet 144 receives any suitable motive fluid 156 from any suitable source that enables end effector system 100 to function as described herein.

Each at least one pneumatic generator 140 is operable in a suction mode and a blower mode. FIG. 5 is a schematic illustration of an exemplary embodiment of pneumatic generator 140 operating in the suction mode, and FIG. 6 is a schematic illustration of the exemplary embodiment of pneumatic generator 140 operating in the blower mode. With reference to FIGS. 4-6, in the exemplary embodiment, each at least one pneumatic generator 140 includes a first valve 158, a second valve 160, a converging portion 162, and a diverging portion 164.

In the exemplary embodiment, in suction mode, first valve 158 is substantially open such that converging portion 162 is in direct flow communication with diverging portion 164. Further in the exemplary embodiment in suction mode, second valve 160 is positioned such that direct flow communication from inlet 144 to process connection 148 is substantially blocked and direct flow communication from process connection 148 to discharge 146 is substantially open. Thus, in suction mode, pneumatic generator 140 functions substantially as a vacuum ejector. More specifically, as motive fluid 156 flows from converging portion 162 through diverging portion 164 towards discharge 146, an under-pressure area 166 is created. Under-pressure area 166 tends to draw air 168 from cavity 130 through orifice 138, inducing a vacuum force that is capable of securely coupling base assembly second side 108 having at least one cavity 130 to surface 16 (shown in FIG. 2). Motive fluid 156 and air 168 are discharged from discharge 146. In alternative embodiments, pneumatic generator 140 includes any suitable number and arrangement of valves and/or other internal structure that enables pneumatic generator 140 to function in suction mode as described herein.

In certain embodiments in suction mode, at least one of first valve 158 and second valve 160 is configured to move to a vacuum-maintenance position after a selected vacuum force is induced. For example, in the exemplary embodiment, after the selected vacuum force is induced, second valve 160 is configured to substantially block flow communication between process connection 148 and discharge 146, and substantially block flow communication between process connection 148 and inlet 144, such that the induced vacuum force is substantially maintained in an absence of further flow of motive fluid 156. Further in the exemplary embodiment, first valve 158 is configured to close after second valve 160 moves to the vacuum-maintenance position, and pump 190 is configured to deactivate. Further in the exemplary embodiment, the at least one of first valve 158 and second valve 160 is configured to automatically return to suction mode, and pump 190 is configured to automatically reactivate, if the induced vacuum force deteriorates to less than a preselected vacuum maintenance level. In alternative embodiments, at least one of first valve 158, second valve 160, and another suitable valve or other structure of pneumatic generator 140 is configured in any suitable fashion to maintain the induced vacuum force above the preselected vacuum maintenance level in an absence of further flow of motive fluid 156.

In the exemplary embodiment, in blower mode, second valve 160 is positioned such that direct flow communication from inlet 144 to process connection 148 is substantially open and direct flow communication from process connection 148 to discharge 146 is substantially blocked. Thus, in blower mode, pneumatic generator 140 functions substantially to generate an air buffer between the at least one cavity 130 and surface 16 (shown in FIG. 2). More specifically, as motive fluid 156 flows from inlet 144 through process connection 148 and orifice 138 into cavity 130, motive fluid 156 reacts against surface 16 and a wall defining cavity 130 to induce an air cushion between base assembly second side 108 and surface 16. The induced air cushion enables base assembly second side 108 having at least one cavity 130 to move substantially frictionlessly across surface 16. In the exemplary embodiment, for example, motive fluid 156 reacts against a shape of each cup-shaped portion 132 and surface 16 to form the air cushion. In alternative embodiments, pneumatic generator 140 includes any suitable number and arrangement of valves and/or other structure, and the at least one cavity 130 and second side 108 are defined by any suitable shape, that enables pneumatic generator 140 to function in blower mode as described herein.

In certain embodiments in blower mode, first valve 158 is closed such that direct flow communication from converging portion 162 to diverging portion 164 is substantially blocked. In alternative embodiments in blower mode, first valve 158 is at least partially open such that at least a portion of motive fluid 156 is directed to discharge 146, rather than to process connection 148. For example, a partially open setting of first valve 158 in blower mode is selected such that the at least one pneumatic generator 140 generates both a selected induced vacuum force in suction mode and a selected induced air cushion in blower mode for a single selected flow rate of motive fluid 156. For example, the single selected flow rate of motive fluid 156 is generated by a single selected setting of pump 190.

Figure 7:
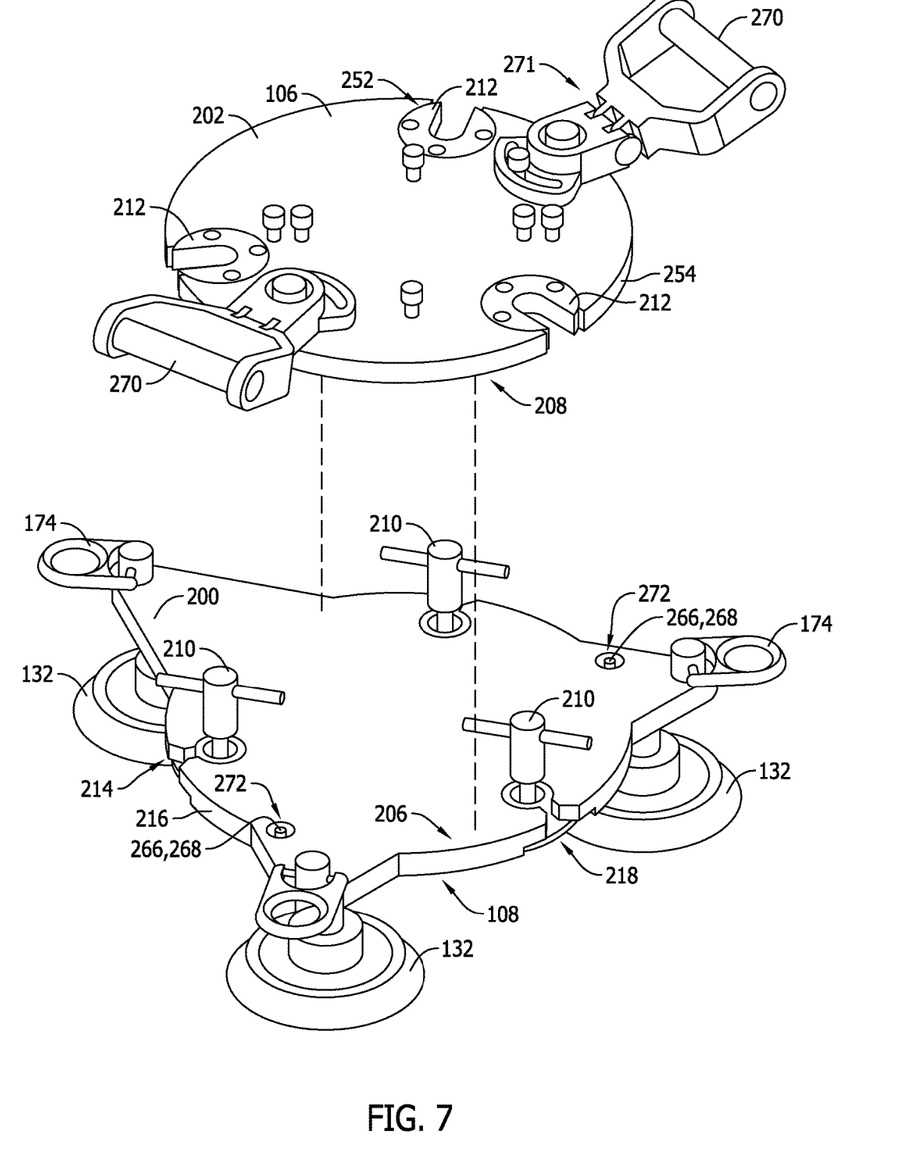
FIG. 7 is an exploded schematic perspective view of the exemplary base assembly shown in FIG. 3.

FIG. 7 is an exploded schematic perspective view of the exemplary embodiment of base assembly 104. In the exemplary embodiment, base assembly 104 includes a base plate 200 and an interface plate 202. Base plate 200 includes second side 108 of base assembly 104, and a first side 206 opposite base assembly second side 108. Interface plate 202 includes base assembly first side 106, and a second side 208 opposite base assembly first side 106. Interface plate 202 is configured to releasably couple to base plate 200 such that base plate first side 206 is in a substantially face-to-face relationship with interface plate second side 208.

More specifically, in the exemplary embodiment, base assembly 104 includes a plurality of releasable connectors 210 each disposed on one of base plate 200 and interface plate 202 and configured to releasably couple to the other of base plate 200 and interface plate 202, such that base plate 200 and interface plate 202 are releasably coupled together. In the exemplary embodiment, plurality of releasable connectors 210 includes three releasable connectors 210. In alternative embodiments, plurality of releasable connectors 210 includes any suitable number of connectors 210 that enables end effector system 100 to function as described herein.

In the exemplary embodiment, each of plurality of releasable connectors 210 is disposed on base plate 200 and is configured to couple to a corresponding receptacle 212 disposed on interface plate 202. In alternative embodiments, at least one of plurality of releasable connectors 210 is disposed on interface plate 202 and is configured to couple to a corresponding receptacle 212 disposed on base plate 200. In the exemplary embodiment, each releasable connector 210 is pivotally connected to base plate 200. More specifically, each releasable connector 210 is pivotable between a locking position (shown in FIG. 9A) and a receiving position (shown in FIG. 9B). Releasable connector 210 in the receiving position is configured to enable interface plate second side 208 to be received adjacent base plate first side 206, while releasable connector 210 in the locking position is configured to extend through, and couple to, the corresponding receptacle 212.

Figure 8:
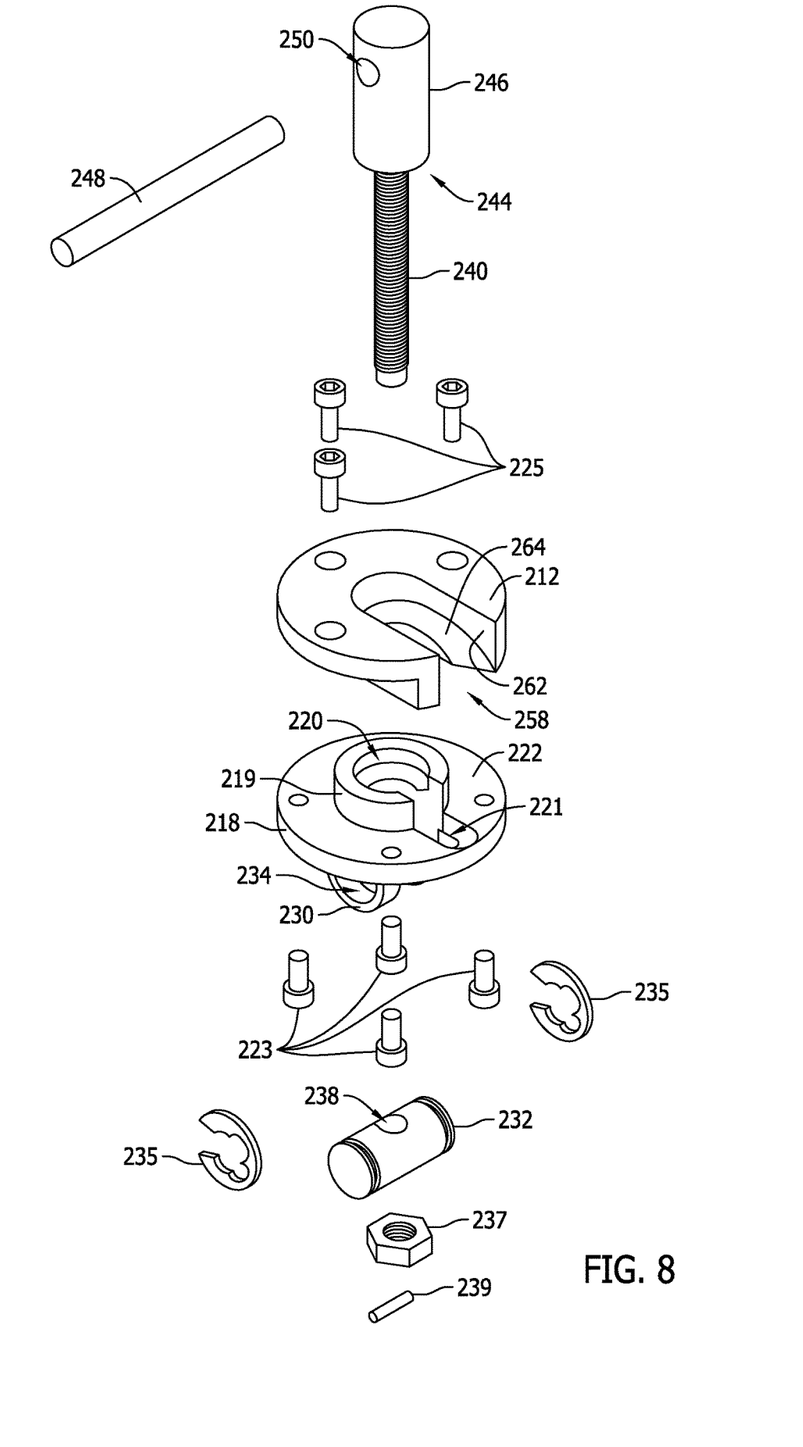
FIG. 8 is an exploded schematic perspective view of an exemplary embodiment of a releasable connector for use with the exemplary base assembly shown in FIG. 3.
Figure 9A:
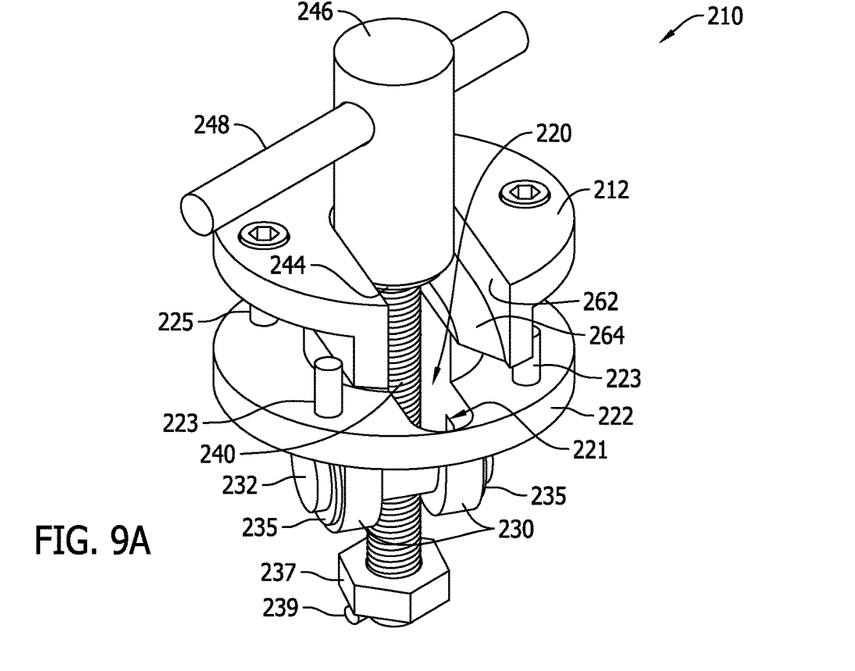
FIG. 9A is a schematic perspective view of the exemplary releasable connector of FIG. 8 in a locking position.
Figure 9B:
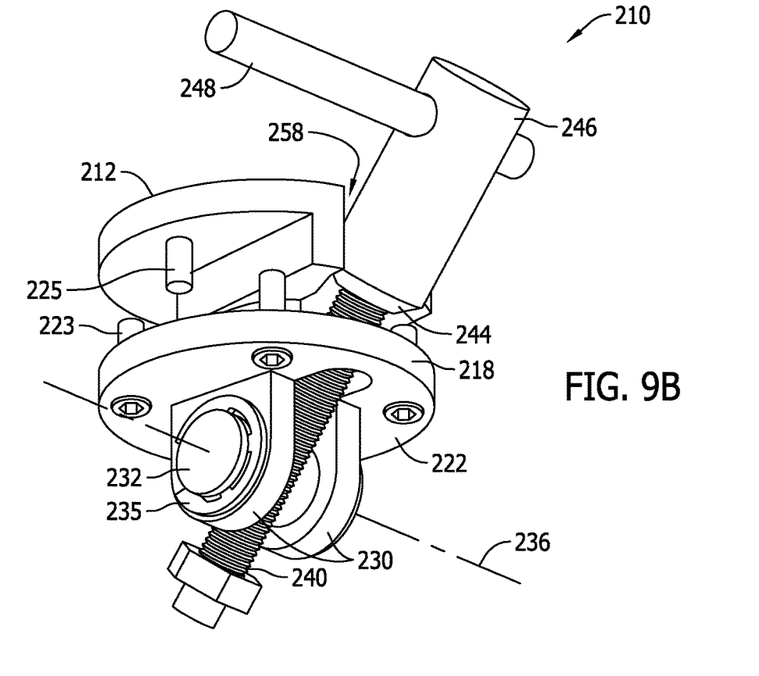
FIG. 9B is a schematic perspective view of the exemplary releasable connector of FIG. 8 in a receiving position.

FIG. 8 is an exploded schematic perspective view of an exemplary embodiment of releasable connector 210. FIG. 9A is a schematic perspective view of releasable connector 210 in the locking position, and FIG. 9B is a schematic perspective view of releasable connector 210 in the receiving position. Base plate 200 and interface plate 202 are omitted from FIGS. 9A and 9B for clarity.

With reference to FIGS. 7, 8, 9A, and 9B, in the exemplary embodiment, releasable connector 210 is pivotally coupled to a connector plate 222 configured to couple to base assembly second side 108 on base plate 200. In the exemplary embodiment, connector plate 222 is configured to couple to base assembly second side 108 using a plurality of fasteners 223. In alternative embodiments, connector plate 222 is configured to couple to one of base plate 200 and interface plate 202 in any suitable fashion. In the exemplary embodiment, a neck portion 219 of connector plate 222 is configured to extend through a gap 214 defined in an edge 216 of base plate 200. An aperture 220 is defined through connector plate 222, and a portion of aperture 220 extends through neck portion 219. In the exemplary embodiment, a threaded portion 240 of releasable connector 210 extends through aperture 220, and a head portion 246 of releasable connector 210 extends above neck portion 219.

In the exemplary embodiment, aperture 220 includes a slotted portion 221 that extends proximate to an edge 218 of connector plate 222. Slotted portion 221 is configured to be positioned proximate to edge 216 when connector plate 222 is coupled to base plate 200. Releasable connector 210 in the receiving position (shown in FIG. 9B) extends at least partially into slotted portion 221, such that head portion 246 is not disposed directly above base plate first surface 206. Releasable connector 210 in the receiving position thus facilitates providing a clearance for receiving interface plate 202 adjacent to base plate 200.

Further in the exemplary embodiment, edge 218 substantially prevents releasable connector 210 in the receiving position from rotating into contact with, and potentially damaging, surface 16 (shown in FIG. 2). In alternative embodiments, one of connector plate 222 and base plate 200 includes another suitable structure that substantially prevents releasable connector 210 in the receiving position from contacting surface 16.

In the exemplary embodiment, connector plate 222 includes a clevis 230 that extends in a direction generally away from head portion 246. Each of the two tangs of clevis 230 includes an aperture 234 extending therethrough, and each aperture 234 is coaxially aligned along an axis 236. A pin 232 is inserted coaxially with axis 236 through apertures 234 of clevis 230. Threaded portion 240 is configured to adjustably couple to pin 232.

More specifically, in the exemplary embodiment, a threaded aperture 238 extends through pin 232 in a direction generally perpendicular to axis 236, and threaded portion 240 is configured to engage threaded aperture 238. A depth of engagement of threaded portion 240 relative to connector plate 222, and hence relative to base plate 202, is adjustable via rotation of head portion 246. In alternative embodiments, aperture 238 is not threaded, and threaded portion 240 extends though aperture 238 in a clearance fit and is adjustably coupled to pin 232 using a suitable nut (not shown). In other alternative embodiments, pin 232 is configured to adjustably couple to releasable connector 210 in any suitable fashion that enables releasable connector 210 to function as described herein.

Pin 232 is rotatable within apertures 234 about axis 236 such that releasable connector 210 is pivotable about axis 236 between the receiving position and the locking position, as described above. In the exemplary embodiment, each releasable connector 210 is biased towards the receiving position by at least one biasing member 235. Biasing each releasable connector 210 towards the receiving position facilitates quickly positioning interface plate second side 208 adjacent base plate first side 206 for coupling to base plate 200 during operations involving surface 16 (shown in FIG. 2). Biasing member 235 has any suitable structure that enables releasable connector 210 to function as described herein. In alternative embodiments, at least one releasable connector 210 is not biased towards the receiving position.

In the exemplary embodiment, releasable connector 210 includes a retaining nut 237 and retaining pin 239 configured to prevent threaded portion 246 from completely disengaging threaded aperture 238. In alternative embodiments, releasable connector 210 does not include a retaining nut 237 and retaining pin 239. In some such alternative embodiments, releasable connector 210 includes another suitable structure configured to prevent threaded portion 246 from completely disengaging threaded aperture 238.

In the exemplary embodiment, releasable connector 210 also includes a grip bar 248 slidably coupled to a head portion 246 of releasable connector 210. For example, grip bar 248 is slidably coupled within an aperture 250 that extends though head portion 246. Grip bar 248 facilitates rotation of head portion 246 by a user to facilitate adjustment of the coupling depth of releasable connector 210 relative to base plate 200. In particular, grip bar 248 facilitates securing releasable connector 210 to interface plate 202 without a need for additional tooling. In alternative embodiments, at least one releasable connector 210 does not include grip bar 248. In some such alternative embodiments, releasable connector 210 includes another suitable structure that facilitates securing releasable connector 210 to interface plate 202 without a need for additional tooling.

In the exemplary embodiment, receptacle 212 is configured to couple to base assembly first side 106 on interface plate 202. In alternative embodiments, at least one receptacle 212 is formed integrally within interface plate 202. In the exemplary embodiment, receptacle 212 is configured to couple to base assembly first side 106 using a plurality of fasteners 225. In alternative embodiments, receptacle 212 is configured to couple to one of interface plate 202 and base plate 200 in any suitable fashion.

In the exemplary embodiment, each receptacle 212 is coupled within an aperture 252 defined in interface plate 202. Aperture 252 extends to an edge 254 of interface plate 202. Receptacle 212 includes an opening 258 configured to extend to interface plate edge 254 when receptacle 212 is coupled to interface plate 202, such that a corresponding releasable connector 210 is receivable within opening 258 of receptacle 212 when interface plate 202 is positioned adjacent base plate 200 and the corresponding releasable connector 210 is moved from the receiving position to the locking position.

In the exemplary embodiment, opening 258 is at least partially defined by an inner wall 262 of receptacle 212 that is configured to bear against head portion 246 of releasable connector 210. In the exemplary embodiment, inner wall 262 includes a tapered surface 264 that is configured to cooperate with a tapered portion 244 of releasable connector 210 to locate interface plate 202 relative to base plate 200 when releasable connector 210 is moved to the locking position. In alternative embodiments, opening 258 is defined within receptacle 212 in any suitable fashion that enables releasable connector 210 to function as described herein.

For example, in the exemplary embodiment, after interface plate 202 is positioned adjacent base plate 200 such that each releasable connector 210 is approximately aligned with a corresponding receptacle 212, releasable connector 210 is moved from the receiving position to the locking position. As releasable connector 210 is moved from the receiving position to the locking position, tapered portion 244 of releasable connector 210 engages tapered surface 264 of receptacle 212. Tapered portion 244 of releasable connector 210 bears against tapered surface 264 of receptacle 212 and urges receptacle 212 into a finer alignment with releasable connector 210, which simultaneously locates interface plate 202 relative to base plate 200. In alternative embodiments, receptacle 212 is aligned with releasable connector 210, and interface plate 202 is positioned adjacent base plate 200, in any suitable fashion that enables releasable connector 210 to function as described herein.

In the exemplary embodiment, after releasable connector 210 is pivoted to the locking position, head portion 246 is rotated, for example using grip bar 248, such that threaded portion 240 of releasable connector 210 engages to a greater depth with threaded aperture 238, securely coupling releasable connector 210 against receptacle 212. For example, tapered portion 244 of releasable connector 210 securely couples against tapered surface 264 of receptacle 212, and interface plate 202 is correspondingly securely and releasably coupled to base plate 200. Grip bar 248 facilitates securing releasable connector 210 to interface plate 202 without a need for additional tooling. Further in the exemplary embodiment, to uncouple interface plate 202 and base plate 200, head portion 246 is rotated, for example using grip bar 248, such that a depth of engagement of threaded portion 240 and threaded aperture 238 decreases. For example, tapered portion 244 of releasable connector 210 disengages from tapered surface 264 of receptacle 212, and releasable connector 210 is moved to the receiving position.

In alternative embodiments, releasable connector 210 includes an additional or different portion, such as but not limited to a suitable washer, that securely couples against an additional or different portion of receptacle 212 when distance 242 is decreased. In other alternative embodiments, releasable connector 210 is coupled within receptacle 212 other than by engagement of a threaded portion and a threaded aperture. In still other alternative embodiments, interface plate 202 and base plate 200 are coupled together in any suitable fashion that enables base assembly 104 to function as described herein.

As described above, base assembly first side 106, disposed on interface plate 202, is configured to couple to end effector 102 (shown in FIG. 2). while base assembly second side 108, disposed on base plate 200, is configured to couple to surface 16 (shown in FIG. 2). In certain embodiments, prior to coupling to interface plate 202 and base plate 200 together, base plate 200 is coupled to surface 16 as described above, and interface plate 202 is coupled to end effector 102. Interface plate 202 and end effector 102 each include any suitable structure that enables interface plate 202 and end effector 102 to be securely coupled together.

Handling base plate 200 by itself during initial coupling to surface 16 facilitates protection of surface 16 from unintentional contact with other elements of end effector system 100. Moreover, coupling interface plate 202 to end effector 102 can be accomplished outside a primary work path for operations on surface 16, facilitating decreased work time on surface 16. For example, each of several end effectors 102 can be coupled to a corresponding dedicated interface plate 202, to facilitate rapid switching of multiple end effectors 102 used with a single base plate 200 coupled to surface 16. In certain embodiments, rapid coupling of base plate 200 and interface plate 202 within the primary work path for surface 16 is facilitated by releasable connectors 210 being at least one of secured to base plate 200, biased to the receiving position, pivotally movable from the receiving position to the locking position, self-locatable within receptacles 212 by cooperating tapered portion 244 and tapered surfaces 264, and securable to interface plate 202 without a need for additional tooling.

With reference to FIGS. 4 and 7, base plate 200 includes a suitable control 266 configured to selectively switch the at least one pneumatic generator 140 between suction mode and blower mode. Control 266 is operatively coupled to the at least one pneumatic generator 140 in any suitable fashion that enables base plate 200 to function as described herein. For example, but not by way of limitation, control 266 is operatively coupled to the at least one pneumatic generator 140 using one of a wired connection and a wireless connection.

In the exemplary embodiment, control 266 includes two switches 268. For example, but not by way of limitation, each switch 268 is a push-button. In the exemplary embodiment, the at least one pneumatic generator 140 defaults to suction mode, and control 266 is configured such that the two switches 268 must be activated approximately simultaneously to switch the at least one pneumatic generator 140 to blower mode. For example, but not by way of limitation, control 266 is configured such that each of the two switches 268 must be activated within 0.5 seconds of each other to switch to blower mode. The at least one pneumatic generator 140 is further configured to automatically return to suction mode when at least one of the two switches 268 is deactivated. The use of two switches 268 thus facilitates prevention of unintentional switching of the at least one pneumatic generator 140 from suction mode to blower mode. To further facilitate avoidance of unintentional activation of control 266 in the exemplary embodiment, each of the two switches 268 is disposed in a depression 272 formed in base plate first side 206, such that each of the two switches 268 is disposed below a surface of base plate first side 206. In alternative embodiments, base assembly 104 includes additional or alternative structure that facilitates prevention of unintentional switching of the at least one pneumatic generator 140 from suction mode to blower mode.

In certain embodiments, control 266 is disposed proximate edge 216 of base plate 202. For example, in the exemplary embodiment, two push-buttons 268 are each disposed proximate edge 216 of base plate 202. Thus, a user may grasp base plate 202 along edge 216, with each thumb adjacent base plate first side 206 and each set of four fingers adjacent base assembly second side 108, and manipulate control 266 using each thumb. In alternative embodiments, control 266 is disposed other than proximate edge 216 of base plate 202.

In certain embodiments, control 266 enables base plate 200 to be easily repositioned during operations on surface 16. For example, base plate 200 is initially coupled to surface 16 at a first location by using the at least one pneumatic generator 140 in suction mode, as described above. A user grasps base plate 200 and activates control 266 to switch the at least one pneumatic generator 140 from suction mode to blower mode. Base assembly second side 108 uncouples from surface 16 and becomes movable over surface 16 substantially frictionlessly via the air cushion induced in blower mode, as described above. The user glides base plate 200 along surface 16 on the air cushion to a second location. The user then releases control 266, causing the at least one pneumatic generator 140 to return to suction mode and recoupling base assembly second side 108 to surface 16 at the second location.

In some embodiments, interface plate 202 includes at least one handle 270. The at least one handle 270 facilitates handling of interface plate 202 by a user, such as but not limited to when end effector 102 is coupled to interface plate 202. For example, in the exemplary embodiments, the at least one handle 270 includes two handles 270 coupled adjacent edge 254 of interface plate 202. Thus, a user may grasp interface plate 202 by handles 270 and manipulate interface plate 202 and end effector 102 into position for coupling to base plate 200, such as but not limited to when base plate 200 is coupled to surface 16. In alternative embodiments, the at least one handle 270 includes any suitable number of handles 270 that enables interface plate 202 to function as described herein. In the exemplary embodiment, each handle 270 is rotatably coupled to interface plate 202 via a biasing member 271, such as but not limited to a torsional spring, to facilitate handling of interface plate 202. More specifically, biasing member 271 inhibits handle 270 from rotating into unintentional contact with end effector 102. In certain embodiments, biasing member 271 biases handle 270 against a hard stop that is configured to prevent unintentional contact between handle 270 and surface 16. In alternative embodiments, the at least one handle 270 does not include biasing member 271 and/or is not rotatably coupled to interface plate 202. In other alternative embodiments, interface plate 202 does not include the at least one handle 270.

Figure 10:
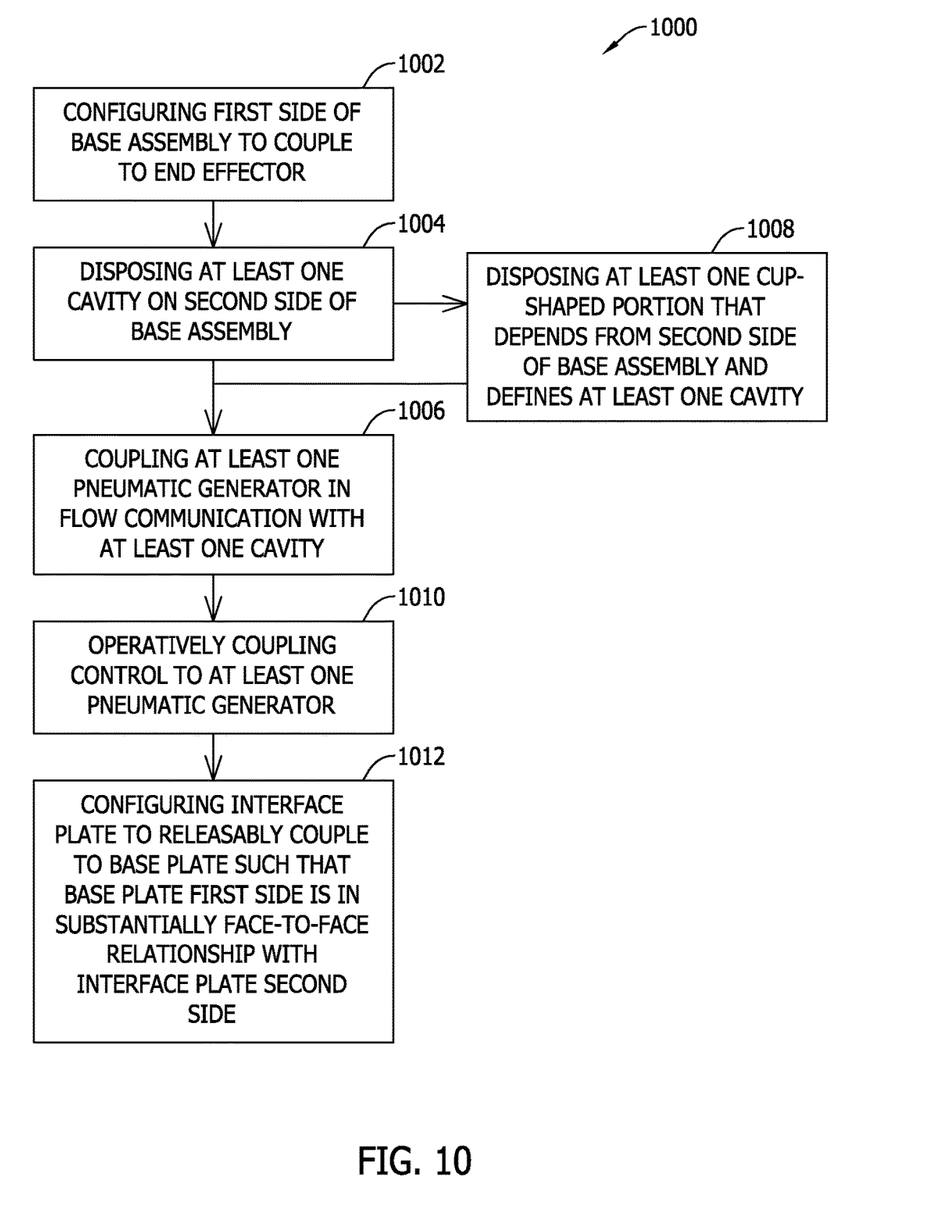
FIG. 10 is a flow diagram of an exemplary method of making a base assembly, such as the base assembly shown in FIG. 3, for coupling an end effector to a structure, such as the aircraft shown in FIG. 1.

FIG. 10 is a flow diagram of an exemplary embodiment of a method 1000 of making a base assembly, such as base assembly 104, for coupling an end effector, such as end effector 102, to a structure, such as aircraft 10. With reference to FIGS. 1-10, in the exemplary embodiment, method 1000 includes configuring 1002 a first side of the base assembly, such as first side 106, to couple to the end effector, and disposing 1004 at least one cavity, such as the at least one cavity 130, on a second side of the base assembly opposite the first side, such as second side 108. Method 1000 also includes coupling 1006 at least one pneumatic generator, such as the at least one pneumatic generator 140, in flow communication with the at least one cavity. The at least one pneumatic generator is operable in a suction mode and a blower mode. The second side having the at least one cavity is securely coupleable to a surface of the structure, such as surface 16, via a vacuum force induced by the pneumatic generator in the suction mode, and the second side having the at least one cavity is movable substantially frictionlessly across the surface via an air cushion induced by the pneumatic generator in the blower mode.

In certain embodiments, disposing 1004 the at least one cavity on the second side of the base assembly includes disposing 1008 at least one cup-shaped portion, such as cup-shaped portion 132, that depends from the second side of the base assembly and defines the at least one cavity. In some embodiments, method 1000 also includes operatively coupling 1010 a control, such as control 266, to the at least one pneumatic generator. The control is configured to selectively switch the at least one pneumatic generator between the suction mode and the blower mode. In certain embodiments, method 1000 further includes configuring 1012 an interface plate, such as interface 202, to releasably couple to a base plate, such as base plate 200, such that a base plate first side, such as base plate first side 206, is in a substantially face-to-face relationship with an interface plate second side, such as interface plate second side 208. The base plate includes the second side of the base assembly and the base plate first side opposite the second side of the base assembly, and the interface plate includes the first side of the base assembly and the interface plate second side opposite the first side of the base assembly.

The embodiments described herein provide improvements over at least some known systems for coupling an end effector to a surface. As compared to at least some known systems for coupling an end effector to a surface, the embodiments described herein enable an end effector to perform manufacture, inspection, maintenance, and/or repair operations with a decreased risk of accidental damage to the structure of interest. As compared to at least some known systems for coupling an end effector to a surface, the embodiments described herein provide a base assembly that can selectively couple to the surface under an induced vacuum force or be moved substantially frictionlessly across the surface on an air cushion. In addition, the embodiments described herein provide for mounting the end effector on an interface plate that can be quickly located and coupled to a base plate mounted on the structure.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A base assembly for coupling an end effector to a structure, said base assembly comprising:
   an interface plate that comprises a first side of said base assembly and an opposite interface plate second side, said first side of said base assembly configured to couple to the end effector;
   a base plate that comprises a second side of said base assembly and an opposite base plate first side, wherein at least one cup-shaped portion depends from said base assembly second side and defines at least one cavity disposed on said second side of said base assembly;
   a plurality of releasable connectors and a plurality of slots corresponding to said plurality of releasable connectors, wherein said releasable connectors are disposed on one of said base plate and said interface plate and said slots are defined in the other of said base plate and said interface plate, each of said releasable connectors is disposed adjacent to an outer edge of said one of said base plate and said interface plate, each of said slots extending from an outer edge of the other of said base plate and said interface plate along a respective slot axis, each of said releasable connectors defines a respective longitudinal axis, each of said releasable connectors movable through a respective one of said slots between a locking position, wherein said respective longitudinal axis is generally perpendicular to said respective slot axis, and a receiving position, wherein said plurality of releasable connectors in the locking position couple to the other of said interface plate and said base plate such that said base plate first side is locked in a non-movable, substantially face-to-face relationship with said interface plate second side, and such that said first side of said base assembly is opposite said second side of said base assembly; and
   at least one pneumatic generator coupled in flow communication with said at least one cavity, said at least one pneumatic generator is operable in a suction mode and a blower mode, wherein:
   said second side of said base assembly having said at least one cavity is securely coupleable to a surface of the structure via a vacuum force induced by said at least one pneumatic generator in the suction mode, and
   said second side of said base assembly having said at least one cavity is movable substantially frictionlessly across the surface via an air cushion induced by said at least one pneumatic generator in the blower mode.

2. The base assembly of claim 1, further comprising a control configured to selectively switch said at least one pneumatic generator between the suction mode and the blower mode, wherein said control comprises two switches operable to switch said at least one pneumatic generator from the suction mode to the blower mode in response to approximately simultaneous activation of said two switches.

3. The base assembly of claim 1, wherein said plurality of releasable connectors in the receiving position completely releases said interface plate from said base plate.

4. The base assembly of claim 1, wherein each of said plurality of releasable connectors in the locking position couples to said other of said base plate and said interface plate adjacent to an outer edge of said other of said base plate and said interface plate.

5. The base assembly of claim 1, wherein at least one of said plurality of releasable connectors comprises a tapered portion configured to cooperate with a tapered surface of said other of said base plate and said interface plate to locate said interface plate relative to said base plate in the locking position.

6. An end effector system coupleable to a structure, said end effector system comprising:
   an interface plate that comprises a first side of a base assembly and an opposite interface plate second side, said base assembly first side coupled to an end effector;
   a base plate that comprises a second side of said base assembly and an opposite base plate first side, wherein at least one cup-shaped portion depends from said base assembly second side and defines at least one cavity disposed on said base assembly second side;
   a plurality of releasable connectors each disposed on one of said base plate and said interface plate, each of said releasable connectors defines a respective longitudinal axis, each of said releasable connectors pivotable between a locking position and a receiving position about a respective pivot axis defined generally perpendicular to said longitudinal axis, wherein said plurality of releasable connectors in the locking position couple to the other of said interface plate and said base plate such that said base plate first side is locked in a non-movable, substantially face-to-face relationship with said interface plate second side, and such that said base assembly first side is opposite said base assembly second side, and wherein said plurality of releasable connectors in the receiving position completely releases said interface plate from said base plate; and
   at least one pneumatic generator coupled in flow communication with said at least one cavity, said at least one pneumatic generator is operable in a suction mode and a blower mode, wherein:
   said base assembly second side having said at least one cavity is securely coupleable to a surface of the structure via a vacuum force induced by said at least one pneumatic generator in the suction mode, and
   said base assembly second side having said at least one cavity is movable substantially frictionlessly across the surface via an air cushion induced by said at least one pneumatic generator in the blower mode.

7. The end effector system of claim 6, further comprising at least one secondary coupling system, each said at least one secondary coupling system defines a secondary coupling system cavity that is releasably coupleable to the surface via a secondary coupling system vacuum force.

8. The end effector system of claim 6, further comprising a control configured to selectively switch said at least one pneumatic generator between the suction mode and the blower mode.

9. The end effector system of claim 8, wherein said control comprises two switches operable to switch said at least one pneumatic generator from the suction mode to the blower mode in response to approximately simultaneous activation of said two switches.

10. The end effector system of claim 6, wherein each of said plurality of releasable connectors is disposed adjacent to an outer edge of said one of said base plate and said interface plate.

11. The end effector system of claim 10, wherein each of said plurality of releasable connectors couples to said other of said base plate and said interface plate adjacent to an outer edge of said other of said base plate and said interface plate.

12. The end effector system of claim 6, wherein at least one of said plurality of releasable connectors comprises a tapered portion configured to cooperate with a tapered surface of said other of said base plate and said interface plate to locate said interface plate relative to said base plate in the locking position.

13. A method of making a base assembly for coupling an end effector to a structure, said method comprising:
 coupling a plurality of pins to one of a base plate and an interface plate, such that each of the pins is rotatable with respect to the one of the base plate and the interface plate about a respective axis, wherein each of the pins defines an aperture extending therethrough in a direction generally perpendicular to the axis;
 coupling each of a plurality of releasable connectors to the aperture of a respective one of the pins, each of the releasable connectors disposed adjacent to an outer edge of the one of the base plate and the interface plate, each of the releasable connectors movable between a locking position and a receiving position via rotation of the respective pin about the respective axis, wherein the plurality of releasable connectors in the locking position couple to the other of the interface plate and the base plate such that a first side of the base plate is locked in a non adjustable non-movable, substantially face-to-face relationship with a second side of the interface plate, wherein the base plate includes a second side of the base assembly opposite the base plate first side, and the interface plate includes a first side of the base assembly opposite the interface plate second side;
 configuring the first side of the base assembly to couple to the end effector;
 disposing at least one cup-shaped portion that depends from the second side of the base assembly and defines at least one cavity on the second side of the base assembly opposite the first side of the base assembly; and
 coupling at least one pneumatic generator in flow communication with the at least one cavity, the at least one pneumatic generator is operable in a suction mode and a blower mode, wherein:
 the second side having the at least one cavity is securely coupleable to a surface of the structure via a vacuum force induced by the at least one pneumatic generator in the suction mode, and the second side having the at least one cavity is movable substantially frictionlessly across the surface via an air cushion induced by the at least one pneumatic generator in the blower mode.

14. The method of claim 13, further comprising operatively coupling a control to the at least one pneumatic generator, the control configured to selectively switch the at least one pneumatic generator between the suction mode and the blower mode.

15. The method of claim 14, wherein operatively coupling the control comprises operatively coupling two switches to the at least one pneumatic generator, the two switches operable to switch the at least one pneumatic generator from the suction mode to the blower mode in response to approximately simultaneous activation of the two switches.

16. The method of claim 13, further comprising disposing the plurality of releasable connectors such that the plurality of releasable connectors in the receiving position completely release the interface plate from the base plate.

17. The method of claim 13, further comprising disposing each of the plurality of releasable connectors such that the plurality of releasable connectors in the locking position couple to the other of the base plate and the interface plate adjacent to an outer edge of the other of the base plate and the interface plate.

* * * * *

UNITED STATES PATENT AND TRADEMARK OFFICE
CERTIFICATE OF CORRECTION

| | |
|---|---|
| PATENT NO. | : 10,001,245 B2 |
| APPLICATION NO. | : 14/562828 |
| DATED | : June 19, 2018 |
| INVENTOR(S) | : Bain et al. |

It is certified that error appears in the above-identified patent and that said Letters Patent is hereby corrected as shown below:

In the Claims

In Column 15, Line 27, Claim 13, delete "non adjustable".

Signed and Sealed this
Twenty-eighth Day of May, 2019

Andrei Iancu
*Director of the United States Patent and Trademark Office*